(12) United States Patent
Schneider et al.

(10) Patent No.: US 8,864,217 B2
(45) Date of Patent: Oct. 21, 2014

(54) PANEL ELEMENT FOR ARRANGEMENT ON A WATER BOX OF A MOTOR VEHICLE BODY

(75) Inventors: Joerg Schneider, Ruesselsheim (DE); Joachim Lacroix, Flonheim (DE)

(73) Assignee: GM Global Technology Operations LLC, Detroit, MI (US)

(*) Notice: Subject to any disclaimer, the term of this patent is extended or adjusted under 35 U.S.C. 154(b) by 19 days.

(21) Appl. No.: 13/474,436

(22) Filed: May 17, 2012

(65) Prior Publication Data

US 2012/0292949 A1 Nov. 22, 2012

(30) Foreign Application Priority Data

May 20, 2011 (DE) .................. 10 2011 106 226

(51) Int. Cl.
*B62D 25/08* (2006.01)

(52) U.S. Cl.
CPC .................. *B62D 25/081* (2013.01)
USPC ........................ 296/208; 296/192

(58) Field of Classification Search
CPC .................................... B62D 25/081
USPC ................................. 296/192, 208
See application file for complete search history.

(56) References Cited

U.S. PATENT DOCUMENTS

| | | | | |
|---|---|---|---|---|
| 5,230,547 A | * | 7/1993 | Koukal et al. | 296/192 |
| 2005/0067859 A1 | * | 3/2005 | Yoshii et al. | 296/192 |
| 2005/0134089 A1 | * | 6/2005 | Borkowski et al. | 296/192 |
| 2010/0187862 A1 | * | 7/2010 | Kurata et al. | 296/192 |

FOREIGN PATENT DOCUMENTS

| | | |
|---|---|---|
| DE | 102007017427 A1 | 11/2008 |
| DE | 10200802489 A1 | 11/2009 |

OTHER PUBLICATIONS

German Patent Office, German Search Report for Application No. 102011106226.6, dated Apr. 10, 2012.

* cited by examiner

*Primary Examiner* — Glenn Dayoan
*Assistant Examiner* — Melissa A Black
(74) *Attorney, Agent, or Firm* — Ingrassia Fisher & Lorenz, P.C.

(57) ABSTRACT

A panel element is provided for arrangement on a water box of a front wall of a motor vehicle body, with a fastening edge for forming a fastening of the panel element arranged upstream of the water box in travelling direction of the motor vehicle and adjoining the water box and with at least one water-conducting depression for the controlled discharge of accumulating water.

20 Claims, 2 Drawing Sheets

B-B

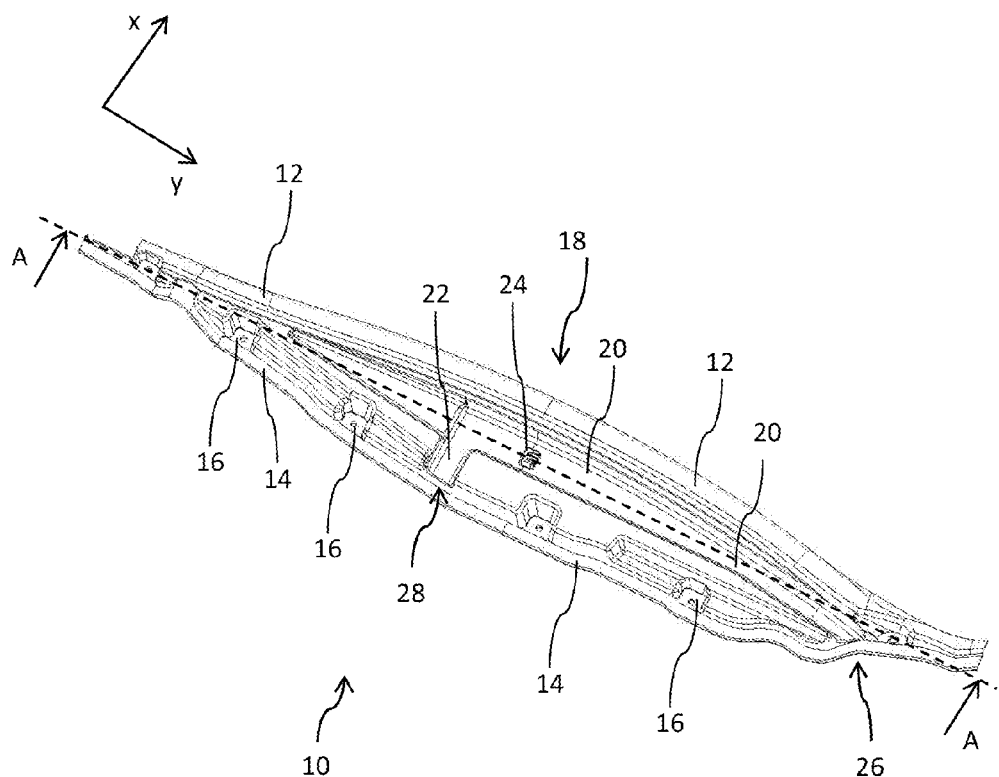
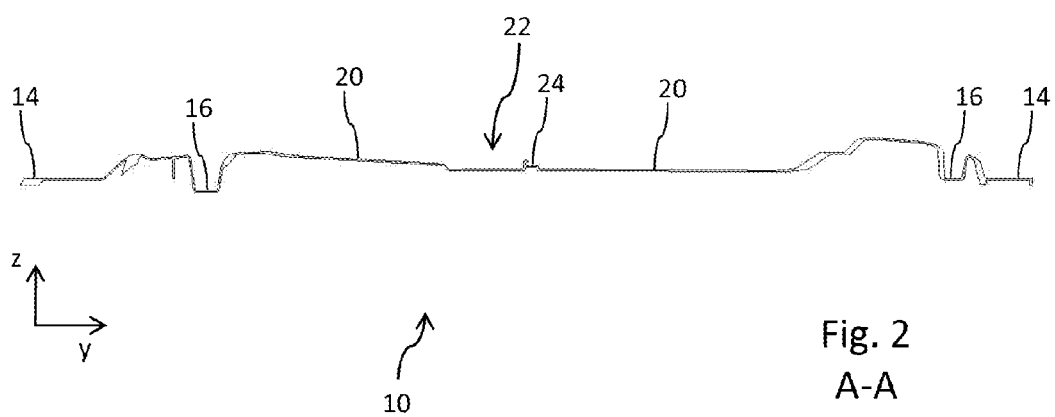
Fig. 1
Fig. 2
A-A

B-B

PANEL ELEMENT FOR ARRANGEMENT ON A WATER BOX OF A MOTOR VEHICLE BODY

CROSS-REFERENCE TO RELATED APPLICATION

This application claims priority to German Patent Application No. 10 2011 106 226.6, filed May 20, 2011, which is incorporated herein by reference in its entirety.

TECHNICAL AREA

The technical field generally relates to a panel element designed as service panel for arrangement on a water box in the front wall region of a motor vehicle body.

BACKGROUND

On an upper end section of a front wall of a motor vehicle body separating the vehicle interior and the engine compartment from each other, typically, a water box protruding towards the front in traveling direction of the vehicle is fastened. Typically it extends between the spring strut mountings of the motor vehicle body. The water box furthermore serves for the fastening and connection of function components, such as for example the windshield wiper linkage or the windshield wiper motor. The water box is typically located in an intermediate space formed between windshield and engine hood.

In an extension protruding towards the front in traveling direction a panel element commonly described as service panel is arranged on the water box designed of sheet metal, which fills out the remaining gap between water box and engine hood. For service or maintenance purposes, the panel element can be disassembled and removed in order to create an access possibility to the function parts arranged below the water box or on the water box.

To protect against dirt and in particular also against water, which can drain off the windshield, the water box is covered towards the top by a water box covering or by a water deflector. Thus, DE 10 2007 017 427 A1 describes for example a water box covering for a motor vehicle with a groove running in vehicle transverse direction for the lateral discharging of water. For forming a groove in a water box covering, the covering however has to have a certain construction height or it is to be designed suitably thick-walled. In addition to an increased space requirement for the water box covering, the forming of a water groove is accompanied by an increase in weight and by an increase of the manufacturing costs for such coverings.

It is therefore at least one object of the present invention to provide water drainage in the region of the windshield that is improved with respect to the installation space distribution of the motor vehicle, which with regard to production and assembly can be realized particularly easily and preferably cost-neutrally. In addition, other objects, desirable features and characteristics will become apparent from the subsequent summary and detailed description, and the appended claims, taken in conjunction with the accompanying drawings and this background.

SUMMARY

A panel element is provided for arrangement on a water box of a front wall of a motor vehicle body. For the sealing fastening on the water box it comprises a fastening edge. With the fastening edge, the panel element, located upstream of the water box, can support itself on the water box located with regard to the traveling direction of the motor vehicle upstream of the water box and can be fastened thereon.

The panel element or service panel in this case functions as an extension protruding in traveling direction to the front of the water box designed as sheet metal part and fastened to the front wall or unitarily formed with said water box. Here, the panel element fills out the intermediate space formed between water box and engine hood. The panel element furthermore comprises at least one water-conducting depression in order to make possible a controlled discharging of accumulating water. Here, the panel element comes to lie in an assembly position below a front and lower end section of a water box covering or a water deflector.

The water draining via the windshield and the water deflector adjoining thereto advantageously enters the at least one water-conducting depression of the panel element located below, so that via the panel element a controlled and predefined discharging of water accumulating in the windshield region can take place.

Through the controlled collecting and discharging of water or further dirt particles that occur an effective protection of the function components that are arranged in or on the water box, for example of windshield wiper drive, windshield wiper linkage, signal horn or further electronic components can be achieved. In addition, the at least one water-conducting depression of the panel element can effectively prevent an uncontrolled spreading of water and moisture in the water box.

According to an embodiment, the at least one water-conducting depression substantially extends in vehicle transverse direction (y), consequently in longitudinal direction of the panel element preferably extending between spring strut mountings of the motor vehicle body. A lateral discharging of received water can be achieved with the depression running in vehicle transverse direction (y). In addition, water that occurs on the panel element can be directly fed to the lateral water drainage openings of the water box with the depression.

In addition or alternatively to the depression running in vehicle transverse direction the panel element comprises a water-conducting depression substantially extending in vehicle longitudinal direction (x). A further water drain can be provided with this longitudinal extension preferably provided in the panel element approximately in the middle. It is in particular provided that the water-conducting depressions always lead into the water box, preferably into a water-conducting structure provided there, regardless of their orientation in vehicle transverse or longitudinal direction.

By embedding water-conducting depressions in the panel element located upstream of the water box a controlled draining off and discharging of accumulating water can take place even immediately adjoining a water box covering or a water deflector. The water fed to the water box can thus be channeled and drained off in a controlled manner as early as possible without any design changes on the water box covering or on the water deflector being required for this purpose. Through the integration of at least one water-conducting depression in the service panel the water deflector on the windshield side can also be designed with water grooves, groove or channel-free as it were and optimized even under aerodynamic aspects.

It is provided furthermore that the water-conducting depressions extending in vehicle longitudinal direction and in vehicle transverse direction are designed as water channels or water grooves leading into one another. The width and/or depth of the water channels or grooves in this case are/is matched to the flow conditions of the water to be expected in the application case. Thus, for example, a variable distribution in longitudinal and transverse channel of the water that occurs can take place depending on prevailing wind or headwind conditions.

According to a further embodiment, if the at least one water-conducting depression is provided with a slope running towards the fastening edge. Consequently, the at least one water-conducting depression of the panel element defines a drainage direction facing the adjoining water box for the water to be drained off. The water-conducting depression in this case can penetrate the fastening edge of the panel element in order to feed the accumulating water to a water-conducting and water-discharging structure of the water box.

Thus it is provided, in particular, that the panel element both laterally as well as opposite to the traveling direction of the motor vehicle borders on the water box of the vehicle front wall, so that a transverse channel in particular also running in vehicle transverse direction leads into a lateral water-conducting structure of the water box. According to a further embodiment it is provided in addition that the panel element is designed as injection molding of plastic. The water-conducting depression is unitarily embedded in the injection molding. A plastic injection molding provided with fiber reinforcement if required can be produced almost cost-neutrally with an integrated water channel. Furthermore, the panel element can be flexibly adapted to predefined installation space requirements of the motor vehicle through the forming of a plastic injection molding.

According to a further embodiment, the position and/or the course of the at least one water-conducting depression of the panel element is matched to the position and/or to the size of air inlet openings of a water deflector or a water box covering adjoining a lower edge of a windshield. Thus, air inlet openings for the fresh air supply of vehicle interior ventilation are to be provided for example in the water deflector or in the water box covering.

By forming water-conducting depressions of the panel element preferably directly below air inlet openings in the panel element, any water entering through the air inlet openings can be drained off in a controlled manner. The position, the course and the size of such inlet openings can in this case be universally adapted to the respective installation space requirements.

According to a further embodiment, the at least one water-conducting depression of the panel element comprises a mouth region adjoining the fastening edge of the panel element, which in assembly configuration on the water box is arranged directly adjoining a water-conducting structure of the water box. The water-conducting depression formed in the panel element can thus be continued in the water box plate in terms of design. Finally, drainage or passage openings for the water fed in via the panel element are provided in or on the water box itself.

According to a further embodiment, the panel element comprises a hood seal on an end section facing away from the fastening edge. With the hood seal located forward in traveling direction, the panel element with closed engine hood adjoins a rear end section of the engine hood from the bottom in order to seal off towards the outside in particular the engine compartment. Furthermore, the panel element comprises an integrated fastening dome for forming a releasable connection with the vehicle front wall and/or a windshield support adjoining thereon. The fastening dome can for example be integrated in the panel element approximately in the middle, even in the at least one water-conducting depression if required. The fastening dome, which is provided spaced from the hood seal as well as from the fastening edge on the panel element, serves, in particular, for the fastening of a brace arrangement in order to be able to support the panel element to adjoining body components in a structurally reinforced manner.

According to a further embodiment, a motor vehicle front wall is provided in addition, which on an upper end section comprises a water box protruding forward, substantially in traveling direction of the motor vehicle. On the front end section of the water box, i.e., facing away from the vertically oriented front wall, a previously described panel element is releasably arranged. The panel element that is preferably designed as plastic injection molding in this case comprises at least one water-conducting depression as described before for the controlled discharging of accumulating water in the water box. According to a further embodiment, the motor vehicle front wall furthermore comprises a water deflector adjoining the lower edge of a windshield or a water box covering functioning as water deflector. The geometry and/or position of the water box covering in this case corresponds to the configuration of the at least one water-conducting depression of the panel element. In this manner, any water entering through the air inlet opening can be discharged in a controlled manner into the water-conducting depression of the panel element located below and finally transferred into water-conducting structures of the water box provided for this purpose.

Finally, a motor vehicle body is provided, which comprises a previously described motor vehicle front wall with a water-conducting panel element. Furthermore, a motor vehicle is provided, which comprises at least one previously described panel element in the region of a front wall.

BRIEF DESCRIPTION OF THE FIGURES

The following detailed description will hereinafter be made in conjunction with the following drawing figures, wherein like numerals denote like elements, and:

FIG. 1 is a perspective and isolated representation of a panel element to be connected to the water box of a motor vehicle front wall;

FIG. 2 is a cross section along A-A through the panel element according to FIG. 1;

DETAILED DESCRIPTION

Figure 3:
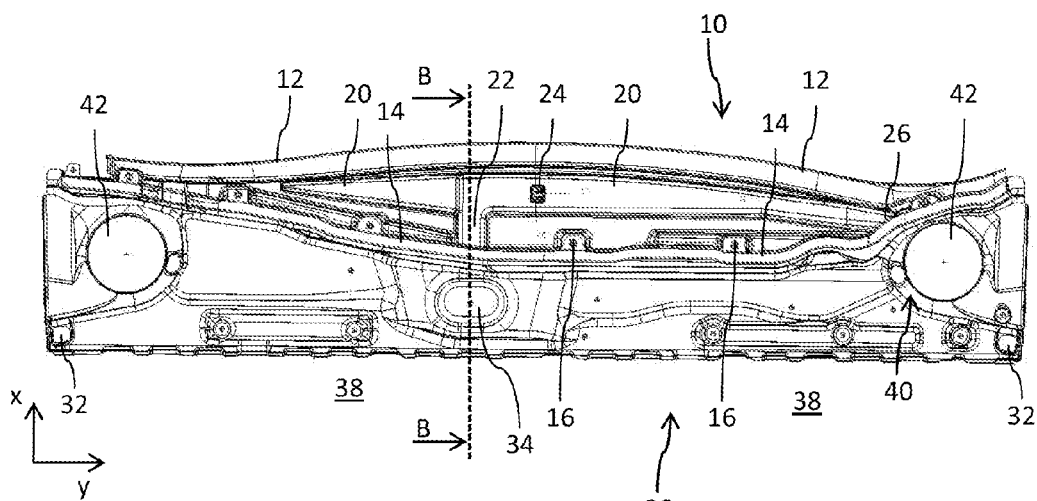
FIG. 3 is a panel element arranged on a water box plate.

The following detailed description is merely exemplary in nature and is not intended to limit application and uses. Furthermore, there is no intention to be bound by any theory presented in the preceding background or summary or the following detailed description.

The panel element 10 shown in FIG. 1 to FIG. 4 in different perspectives and cross sections is embodied as so-called service panel. It comprises a glass fiber-reinforced plastic part, in particular a plastic injection molding or plastic molding, which next to individual fastening depressions 16 comprises a fastening edge 14. With the fastening edge 14, the panel element 10 can support itself on a water box 30 which, with respect to the travelling direction of the vehicle, is arranged downstream, as is shown for example in the cross section of FIG. 4.

As is indicated furthermore in FIG. 1, the fastening edge 14 extends almost over the entire length or over the transverse extension (y) of the panel element 10. The fastening edge 14 in this case is adapted to the shaping of the water box 30 arranged downstream with respect to the traveling direction. Towards the front, in traveling direction (x) the panel element 10 comprises a hood seal or a support edge 12 for the engine hood of the motor vehicle.

The panel element 10 or service panel serves in particular for being disassembled and released from the water box 30 in the case of service or maintenance. Through the disassembly of the panel element 10, accessibility to the function components fastened to the water box 30 and not explicitly shown in the Figures such as for example for the windshield wiper motor or a windshield wiper linkage can be created.

Adjoining the fastening edge 14, the panel element 10 comprises individual pocket-like depressions 16, for example for receiving screws or similar fastening means, by means of which the panel element 10 can be fastened to the water box 30. The panel element 10 furthermore is traversed by a channel structure 18, which in this case comprises a transverse channel 20 and a longitudinal channel 22. In the representation according to FIG. 1, the transverse channel 20 extends approximately from the upper left fifth of the panel element 10 as far as to a mouth region 26 located on the right which protrudes up against the fastening edge 14. In the assembly position shown in FIG. 3, the mouth region 26 adjoins and leads into a water-conducting structure 40 of the water box 30. Water accumulating in the panel element 10 can thus be directed via the transverse channel 20 and its mouth region 26 into a lateral water-conducting structure 40 of the water box 30 enclosing a spring strut mounting 42, from where it can drain downwards towards the side wall of the motor vehicle body via a drainage opening 32.

In addition to a transverse channel 20 extending over wide parts of the panel element 10 the channel structure 18 is furthermore provided with a longitudinal channel 22, which is located approximately in the middle of the panel element 10 and which substantially extends in vehicle longitudinal direction (x). The longitudinal channel 22, too, adjoins the fastening edge 14 with a mouth region 28, so that water draining via the longitudinal channel 22 can equally be discharged into a drainage opening 34 of the adjoining water box 30.

Figure 4:
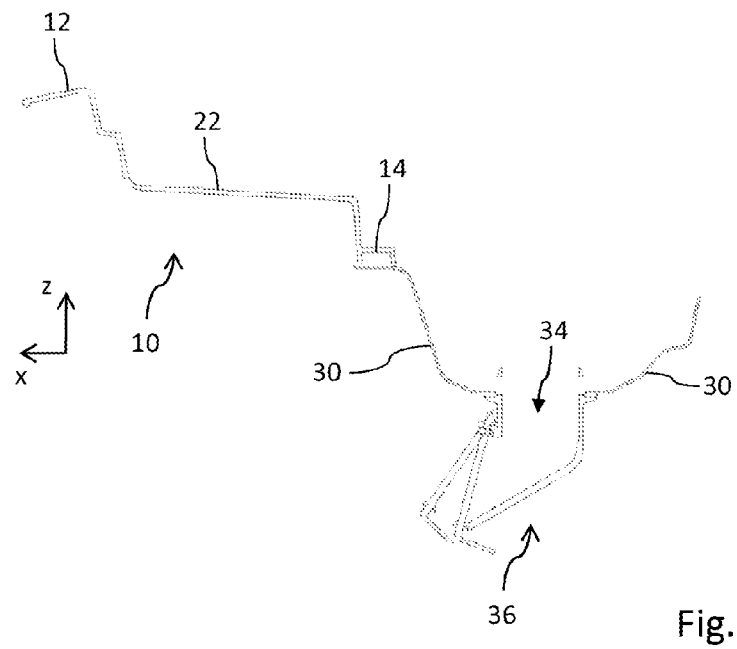
FIG. 4 is a cross section along the section line B-B through the arrangement according to FIG. 3.

In the representation according to FIG. 3 and FIG. 4, the water accumulating for example in the longitudinal channel 22 can be discharged, via the slope oriented contrary to the traveling direction, via the fastening edge 14 located lower with respect to the channel 22, into the water box 30 located lower and downstream in traveling direction. In this region located approximately in the middle between the lateral spring strut mountings 42, the water box 30 comprises a drainage opening 34 which is provided with a drainage or water drain valve 36. By way of the water drain valve 36, backing-up water can be drained off in a controlled manner.

In the cross section along A-A according to FIG. 2, the slope of the transverse channel 20 running from the left to the right is additionally indicated. As is evident, the channel 20 starting from a left fastening point has a slope directed towards the middle and towards the longitudinal channel 22. Since the cross section A-A shown in FIG. 2 does not exactly correspond to the course of the transverse channel 20, the mouth region 26 located on the right in this representation of FIG. 1 is not shown explicitly. Instead, FIG. 2 shows a front profile section enclosing the channel 20 towards the front in traveling direction (x) in the end section of the panel element located on the right, which comprises a further fastening point and the fastening edge 14. Although the cross section shown in FIG. 2 does not exactly coincide with the transverse channel 20, the latter comprises a continuous slope towards the mouth region 26 located on the right in FIG. 1.

Depending on the prevailing outside conditions, water accumulating in the water box or in its panel element located upstream via the water deflector can disperse arbitrarily over the transverse channel 20 and the longitudinal channel 22, which terminate within each other in the service panel approximately in the middle. The water received by the panel element 10 and fed in via the water deflector not explicitly shown here, can be channeled through the channel structure 18 integrated in the panel element 10 even immediately after any dripping off or draining from a water deflector on the windshield side, and accordingly, drained off to the adjoining water box 30 and the drainage openings 32, 34 provided therein or water-conducting structures 40 in a controlled manner.

In FIG. 1, FIG. 2 and FIG. 3 a fastening dome 24 is shown furthermore, which is arranged in the transverse channel 20 and which also slightly protrudes from the latter if required. The fastening dome 24 serves for a brace-like fastening of a complementary holder for the panel element 10, so that the latter in addition to a fastening along the fastening edge 14 can still be releasably connected separately to adjoining body components, for example to a windshield support which is not explicitly shown here or further sections of a front wall 38 merely indicated in FIG. 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A panel for connection to a water box that is directly attached to a front wall of a body of a motor vehicle, the water box extending between two transversely separated strut mountings of the motor vehicle, comprising:
   a panel element;
   a fastening edge, the fastening edge being configured to form a direct connection to the front of the water box in the traveling direction between the panel element arranged forward of the water box in a travelling direction of the motor vehicle; and
   a water-conducting depression in the panel element extending substantially between the two laterally separated strut mountings that is configured to control a discharge of water that is accumulated in the water box.

2. The panel element according to claim 1, wherein the water-conducting depression substantially extends in a vehicle longitudinal direction.

3. The panel element according to claim 2, wherein the water-conducting depression extending in the vehicle longitudinal direction and in vehicle transverse direction is formed as water channels leading into one another.

4. The panel element according to claim 1, wherein the water-conducting depression comprises a slope running towards the fastening edge.

5. The panel element according to claim 1, wherein the panel element is at least partially formed of injection molding of plastic with an integrated water-conducting depression.

6. The panel element according to claim 1, wherein a position of the water-conducting depression is substantially matched to a position of air inlet openings of a water deflector adjoining a lower edge of a windshield.

7. The panel element according to claim 1, wherein a mouth region of the water-conducting depression adjoining the fastening edge is arranged directly adjoining a water-conducting structure of the water box.

8. The panel element according to claim 1, further comprising a hood seal on an end section facing away from the fastening edge.

9. The panel element according to claim 1, furthermore comprising an integrated fastening dome that is configured to form a releasable connection with a vehicle front wall.

10. The panel element according to claim 1, furthermore comprising an integrated fastening dome that is configured to form a releasable connection with a windshield support.

11. A front wall of a motor vehicle, comprising:
an upper end section;
a water box protruding to a front on the upper end section substantially in a travelling direction of the motor vehicle,
a panel element releasably arranged on a front end section of the motor vehicle, the panel element comprising:
a fastening edge that is configured to form a fastening of the panel element arranged upstream of the water box in the travelling direction of the motor vehicle and adjoining the water box; and
a water-conducting depression that is configured to control a discharge of water that is accumulated in the water box.

12. The front wall according to claim 11, wherein the water-conducting depression substantially extends in vehicle transverse direction.

13. The front wall according to claim 11, wherein the water-conducting depression substantially extends in a vehicle longitudinal direction.

14. The front wall according to claim 13, wherein the water-conducting depression extending in the vehicle longitudinal direction and in vehicle transverse direction is formed as water channels leading into one another.

15. The front wall according to claim 11, wherein the water-conducting depression comprises a slope running towards the fastening edge.

16. The front wall according to claim 11, wherein the panel element is at least partially formed of injection molding of plastic with an integrated water-conducting depression.

17. The front wall according to claim 11, wherein a position of the water-conducting depression is substantially matched to a position of air inlet openings of a water deflector adjoining a lower edge of a windshield.

18. The front wall according to claim 11, wherein a mouth region of the water-conducting depression adjoining the fastening edge is arranged directly adjoining a water-conducting structure of the water box.

19. The front wall according to claim 11, further comprising a hood seal on an end section facing away from the fastening edge.

20. A panel element for arrangement on a front side of a water box mounted on a front wall of a motor vehicle body, the panel element comprising:
a front edge;
a rear fastening edge configured to form a fastening of the panel element to the front side of the water box and,
at least one water-conducting depression configured to control discharge water.

* * * * *